April 25, 1933.  A. B. MODINE  1,905,487
AUTOMOBILE HEATER
Filed May 14, 1930  2 Sheets-Sheet 1
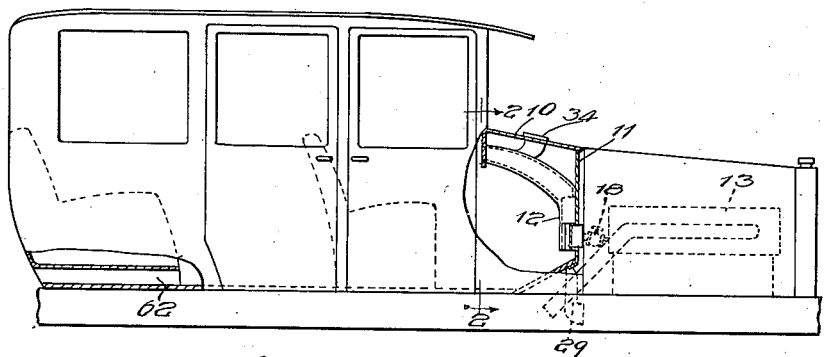
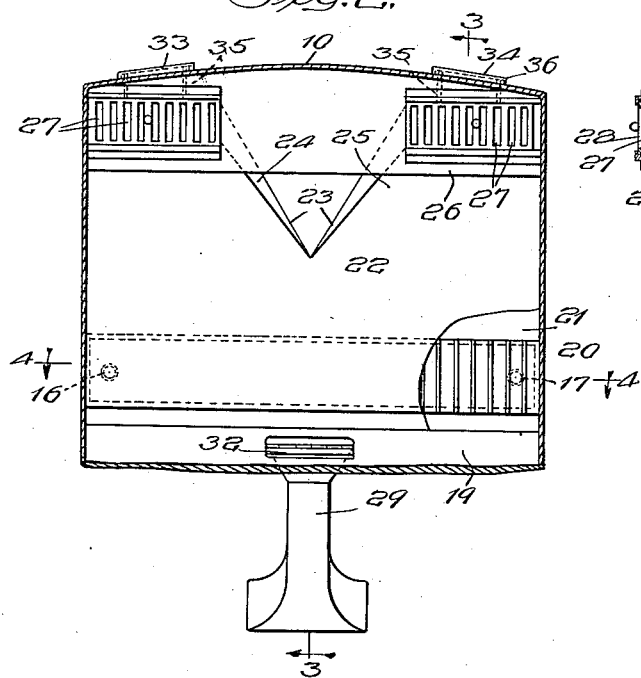
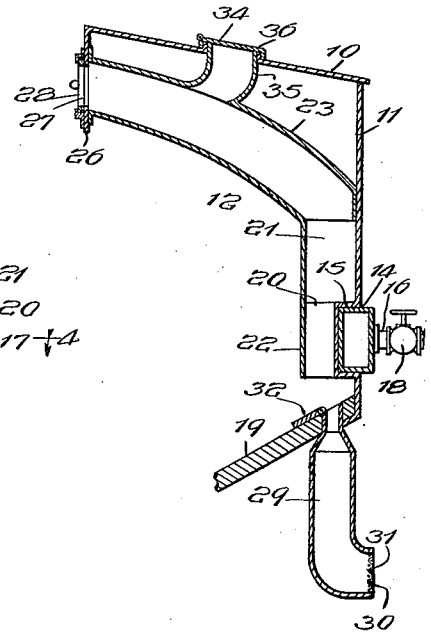
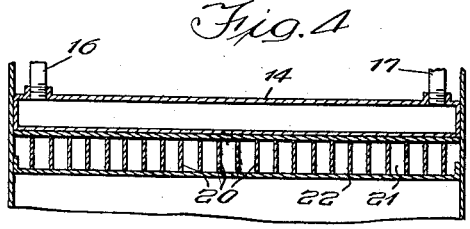
Inventor:
Arthur B. Modine April 25, 1933. A. B. MODINE 1,905,487
AUTOMOBILE HEATER
Filed May 14, 1930 2 Sheets-Sheet 2
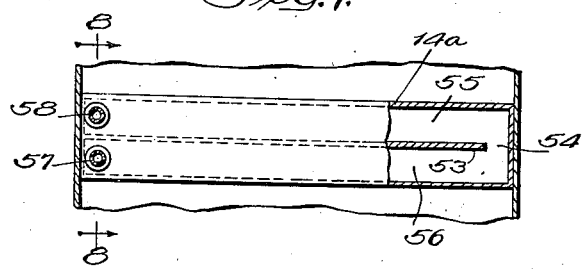
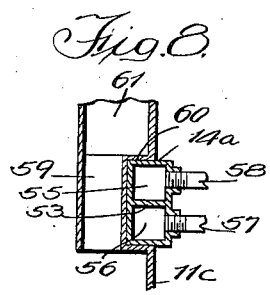
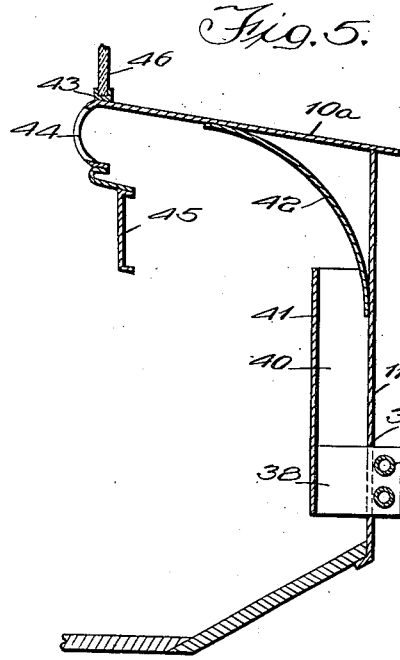
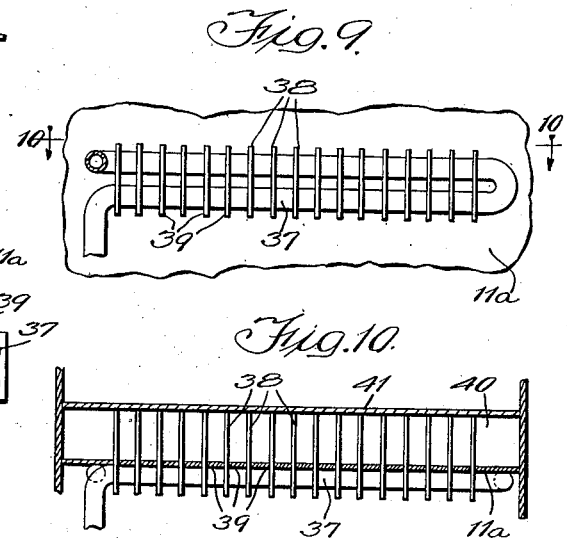
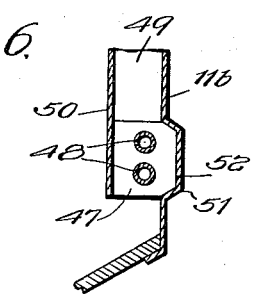
Witness:
William P. Kilroy
Inventor:
Arthur B. Modine
By Hill & Hill Patented Apr. 25, 1933

1,905,487

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

AUTOMOBILE HEATER

Application filed May 14, 1930. Serial No. 452,319.

The invention relates to a device for heating the interior of a body of a vehicle such as an automobile.

The invention has as an object the accomplishment of heating a vehicle body through the agency of the exhaust gases resulting from combustion of fuel fed to an internal combustion engine. It is a prime object of the invention to arrange the means whereby heating of the vehicle body is accomplished, so that fumes which may escape from said means are prevented from entering the interior of the vehicle body.

The invention has as another object the provision of means for heating a vehicle body through the agency of either heated gases or a heated fluid, the means by which the heated gas or fluid is conducted being arranged relatively to a portion of the vehicle body, preferably a wall thereof such as the dash board so that said wall is heated by conduction and the heat thus transmitted to the interior of the vehicle body to supply heat thereto.

Another object of the invention is to associate with a device such as that above referred to, means for causing circulation of the heated air within the vehicle body and in addition to combine therewith means for accelerating air circulation.

Another object of the invention is to combine with a structure such as that above referred to a means for introducing fresh air to the device so that fresh heated air may be introduced to the interior of the vehicle body.

In addition to the above, it is also an object to provide the means whereby circulation of air within the vehicle body is produced with means whereby the interior of the body may be cooled.

A further object is to provide means for controlling the circulation of the air currents.

Another object of the invention is to employ heat radiating fins and to connect said fins with an element of the heating device, the fins being located in the path of the air currents circulating through the heating device to thereby transmit heat to said air.

The invention has these and other objects, all of which will be explained in detail and more readily understood when read in conjunction with the accompanying drawings which illustrate various embodiments of which the invention is susceptible, it being obvious that changes and modifications may be resorted to without departing from the spirit of the appended claims forming a part hereof.

In the drawings, Fig. 1 is a side elevation, partially in section, of a vehicle body having this invention applied thereto;

Fig. 2 is a section taken along the line 2—2 of Fig. 1;

Fig. 3 is a section taken on the line 3—3 of Fig. 2;

Fig. 4 is a section taken on the line 4—4 of Fig. 2;

Fig. 5 is a view similar to Fig. 3 showing a modified construction which may be resorted to;

Fig. 6 is a fragmentary section of the lower portion of an air duct having another arrangement applied thereto whereby air may be heated and conducted therefrom to the interior of the vehicle body;

Fig. 7 is a side elevation, partially in section, of a modified heating element;

Fig. 8 is a section taken on the line 8—8 of Fig. 7;

Fig. 9 is an elevational view of a portion of the heating element illustrated in Fig. 5; and Fig. 10 is a sectional view taken on the line 10—10 of Fig. 9.

The invention herein disclosed is shown in part in the application filed by me April 16, 1930, Serial Number 444, 698 in which is disclosed a means for heating a wall of the vehicle body and utilizing the heat of said wall for heating air circulating in contact with said wall.

The structure herein shown for accomplishing the heating of air and the circulation of the heated air within a vehicle body and also introducing fresh air to the interior of the body is designed to be located below the cowl 10 of the vehicle body and to be arranged with respect to the dash board 11 of the body so that the dash board which is usually of metal may be heated by conduction to thereby provide means for heating a current of air which contacts with said dash board during its circulation into the body. A device capable of utilizing the exhaust gases eminating from an internal combustion engine such as 13 is designated generally by the numeral 12 and as most clearly shown in Figs. 2 and 3, contemplates the utilization of a tubular element 14 which extends transversely of the vehicle body in contact with the dash board 11, the dash board 11 being preferably recessed as indicated at 15 to receive said tubular element 14 and provide for close contact between said element and the dash board to thereby heat said dash board through the agency of conduction.

The tubular element 14 may be of any desired cross sectional shape and is provided with an inlet connection 16 and an outlet connection 17, it being understood that the inlet and outlet connections are connected with either the exhaust manifold or exhaust pipe of the engine and may be provided with a valve such as 18 for controlling the passage of heated exhaust gases through said connections and tubular element 14. This tubular element 14 and other portions of the structure are preferably located in spaced relation to the foot board 19 of the vehicle body so to thus provide a space through which relatively cool air located in the lower portion of the vehicle may pass and be introduced to the heating device generally designated 12.

In the particular construction illustrated in Figs. 1 to 4, inclusive, heat radiating fins 20 are secured in any suitable manner to the dash board or wall 11 and project inwardly toward the vehicle body and into an air passage 21 formed by a wall 22 and walls 23. In the particular structure illustrated and best shown in Fig. 2, the air passage formed by said walls 22 and 23 is divided at its upper end to form the branches 24 and 25 which terminate adjacent the instrument board 26 of the vehicle and discharge into the vehicle. It is understood that the instrument board is provided at each termination of said branching passages 24 and 25 with a plurality of openings such as 27 through which the heated air circulating through said passages is discharged into the interior of the vehicle. Each of the branches 24 and 25 may be provided with a damper 28 so as to regulate the amount of heated air entering the vehicle body.

It is manifest that relatively cool air contained within the vehicle body will enter the space provided between the foot board 19 and the lower termination of the heat conducting passage 21 and enter the heating compartment, contact with the heat transmitting fins 20 and also contact with the wall or dash board 11, be heated thereby and thus travel through the passages 24 and 25 and out through the vent openings 27 provided in the instrument board 26. As before stated, the structure includes means for facilitating circulation of air within the vehicle body which also provides means for introducing fresh air thereto.

It may be here stated that the means for accomplishing this last mentioned feature may include a fan and a motor (not shown) which will augment circulation of air through the heating device and into the vehicle body. The means for introducing fresh air to the vehicle may be any desired construction, that herein shown includes a tubular element 29 which has one end thereof such as 30 facing in the direction of travel of the vehicle and has the opposite end secured to the foot-board 19. The end 30 may be closed by a screen which will reduce the possibility of dust entering the vehicle at this point. It is manifest that as the machine is propelled in a forward direction, air enters the tubular element 29 and is discharged into the passage 21, it being understood that during its passage, said air contacts with the heat radiating or transmitting fins 20 and the wall 11 and is heated prior to its discharge from the open ends of the branching passages 24 and 25. A damper such as 32 may be employed to control and vary the amount of air passing from the tubular element 29 into the vehicle.

The structure also contemplates the utilization of means such as those designated 33 and 34 for introducing cool air to the branching passages 24 and 25. This means generally designated 33 and 34 contemplates a tubular passage 35 which extends through the cowl 10 and communicates with the respective passages 24 and 25, the passage 35 having a closure 36 associated therewith, which closure opens in a manner to gather air when the machine is propelled in a forward direction and will thus introduce said air into the passages 24 and 25. It will be noted that these air passages 35 are arranged with respect to the heating fins and fluid passage 14, so that the air entering said passages 35 will be introduced to the vehicle in a cool condition as it is evident that this air does not contact with the heater on any element thereof.

As before stated, the invention also contemplates a means for heating by conductivity which means employs as the heating medium the fluid which serves as a cooling medium for the engine and which is pumped and circulated through the jacket of the engine. A means whereby this last mentioned heating medium may be employed is illustrated in Figs. 5, 6, 9 and 10 and includes a coil 37 which is arranged in close proximity to the dash board 11a and transversely of the vehicle in a manner similar to the tubular element 14, it being understood that the coil has an inlet and outlet which connects with the system for the cooling medium of the engine.

The coil 37 is located exteriorly of the dash board 11a and is provided with a plurality of heat radiating fins 38 which extend through apertures 39 provided in the dash board 11a and project into an air passage 40 which includes the dash board or wall 11a and the wall 41. This structure is also located in spaced relation to the foot board of the vehicle so that relatively cool air located in the lower portion of the vehicle body may circulate into the structure, be heated thereby and be discharged in a heated condition from the device.

A deflector plate 42 extends from the upper open end of the passage 40 to the cowl 10a. The cowl 10a in the structure shown in Fig. 5 is formed as indicated at 43 to provide a bead and the material forming said bead is provided with a plurality of apertures 44, so that heated air may be discharged through said apertures into the vehicle body.

This bead 43 is usually located above the instrument board 45 between said instrument board and the windshield 46. In Fig. 6, a modified arrangement is illustrated in which heat radiating fins such as 47 are secured to heat coils 48, the heat coils being arranged within a passage 49 formed by the dash board 11b and a wall 50.

It will be noted that in this last mentioned structure, the heat radiating fins contact with the dash board 11b and, therefore, will heat the dash board by conductivity when heated fluid is circulated through the coils 48. The dash board 11b may be formed with a longitudinal and transversely extending depression 51 which provides a recess for the reception of the adjacent edges such as 52 of the fins 47.

In Figs. 7 and 8, a slightly modified arrangement is illustrated which may be employed instead of the tubular element 14. The structure illustrated in Figs. 7 and 8 is designated 14a and is designed to provide a tortuous path for the heated gases so that the maximum amount of heat may be extracted from the gases prior to their discharge from the device, and therefore, said tubular passage 14a is divided by a wall 53 which is of a lesser length than the tubular passage, and thus provides an opening 54 through which the heated gases or liquid may travel from one of the passages such as 55 to the other such as 56 prior to its discharge through the pipe connection 57. It is understood that an inlet pipe 58 is provided whereby the heated gases or liquid may be introduced to the tubular element 14a. By referring to Fig. 8, it will be noted that this structure also contemplates the utilization of heat radiating fins such as 59 and that said tubular element 14a may be arranged within a recess 60 which is formed in the dash board 11c which will transmit heat to the dash board and the fins and heat air circulating through the passage 61 in a manner similar to the structures previously described.

By referring to Fig. 1, it will be noted that the vehicle body is provided with an air passage 62 which communicates with the interior of the vehicle body and terminates at the rear end thereof and thus, when the car is in motion, air will be extracted from the interior of the vehicle body because, as is well known, an area of reduced pressure exists at the rear end of the car which is employed to draw air through said passage from the interior of the vehicle body.

Having thus described the invention, it is manifest that an arrangement is provided, whereby air may be heated through a heating medium which may either be the exhaust gases resulting from combustion or the fluid employed for cooling the engine, which heating medium is passed through an element arranged with respect to a wall of the vehicle so that said wall and other elements associated with the wall are heated by conductivity which may be employed to heat air contained within the vehicle body. It is further manifest that an arrangement is disclosed whereby the heat conducting element is arranged with respect to the interior of the vehicle body so that gases of the heating medium are prevented from finding their way into the interior of the vehicle body.

It is further evident that the arrangement embodies means for introducing fresh air to the vehicle and in addition, has means associated therewith for introducing cool air to the vehicle body.

In addition to the above, it is evident that when the circulating heating medium is shut off and the closures provided in the cowl of the automobile are arranged to allow the introduction of air therethrough, that this last mentioned structure will provide a means for cooling the interior of the automobile when said vehicle is in motion. It is further manifest that through the means of a damper such as 28 that the amount of heated air entering the vehicle body may be regulated.

Having thus described the invention, what I claim and desire to cover by Letters Patent is:

1. In a vehicle heater, the combination of a heater element and a wall of a vehicle body, the heater element being located exteriorly of said wall of said body and arranged with respect to said wall to transmit heat to said wall, to thereby provide heating means including said wall, and an element associated with said wall, said element providing a wall of a heat duct, the opposite ends of said duct being in communication with the interior of the vehicle body.

2. In a vehicle heater, the combination of a heater element and a wall of a vehicle body, the heater element being located exteriorly of said wall of said body and arranged with respect to said wall to transmit heat to said wall, to thereby provide heating means including said wall, a wall providing an element of a duct which includes said wall of the vehicle body, and heat radiating fins associated with said heater element, said fins being located in said duct.

3. In a vehicle heater, the combination of a heater element and a wall of the vehicle body arranged with respect to each other to supply heat from said heater element to said wall by conduction, means providing a passage for heated air associated with said element and wall, said passage having a communication with the interior of the vehicle body, and means associated with said passage for inducing a current of air in said passage.

4. In a heater for vehicles, the combination of a member providing a passage for conducting heating fluid and a member forming a wall of the vehicle body, means providing an element of air passage, said means being located upon one side of said wall, said first mentioned member providing said heating fluid passage being arranged upon the opposite side of said wall and heat radiating fins arranged in said air passage adjacent said heating fluid passage.

5. In a heater for vehicles, the combination of a member forming a passage for conducting heating fluid, a wall of the vehicle body, fins secured to said member and extending through said wall and means providing an air passage located at one side of said wall, said fins being located in said passage.

6. In a heater for vehicles, the combination of a member providing a passage for conducting heating fluid, a member forming a wall of the vehicle body and means providing an element of an air passage located at one side of said wall, heat radiating fins extending from one wall of said air passage to the other and said member providing said passage being arranged relatively to said fins to transmit heat to said fins.

7. A heater for a vehicle having a closed body and an internal combustion engine, said heater being comprised of a hollow member providing a passage for a heating medium and a metallic wall which is an integral element of the body structure, said wall and hollow member being in contact with each other to thereby heat said wall and heat the interior of said body by said wall, means for connecting said hollow member with a heat conducting element of said engine and an air duct associated with said heater, the inlet and outlet of said duct terminating within the vehicle body.

8. A heater for a vehicle having a closed body and an internal combustion engine, said heater being comprised of a hollow member providing a passage for a heating medium and a metallic wall which is an integral element of the body structure, said wall and hollow member being in contact with each other to thereby heat said wall and heat the interior of said body by said wall, an element located in spaced relation to said wall and cooperating with said wall to provide a duct the inlet and outlet thereof being located within the vehicle body and providing means for circulating heated air in the interior of said vehicle body, and means for connecting said hollow member with a heat conducting element of said engine.

9. A heater for a vehicle having a closed body and an internal combustion engine, said heater being comprised of a hollow member providing a passage for a heating medium and a metallic wall which is an integral element of the body structure, said wall and hollow member being in contact with each other to thereby heat said wall and heat the interior of said body by said wall, said wall being located between said hollow member and the interior of said vehicle body to thereby locate said heater exteriorly of said body.

10. A heater for a vehicle having a closed body and an internal combustion engine, said heater being comprised of a hollow member providing a passage for a heating medium and a metallic wall which is an integral element of the body structure, said wall and hollow member being in contact with each other to thereby heat said wall and heat the interior of said body by said wall, said wall having a recess for the reception of said hollow member.

11. A heater for a vehicle having a closed body and an internal combustion engine, the body having a wall arranged transverse to the length of said body and providing a wall closing one end of the vehicle body, a heater element located between opposite marginal edges of said wall to provide a member extending along an edge of and adapted to be heated by conduction by said element, means for connecting said element with a heat conducting member of said engine and a member providing an air duct, the opposite ends of which communicate with the interior of said vehicle body said duct having means providing a communication with atmosphere at the exterior of said vehicle body.

In witness whereof, I hereunto subscribe my name this 25th day of April A. D., 1930.

ARTHUR B. MODINE.